(12) United States Patent
Uekusa et al.

(10) Patent No.: US 9,591,203 B2
(45) Date of Patent: Mar. 7, 2017

(54) IMAGE PROCESSING APPARATUS, IMAGE PROCESSING METHOD, RECORDING MEDIUM, AND IMAGE PICKUP APPARATUS

(71) Applicant: CANON KABUSHIKI KAISHA, Tokyo (JP)

(72) Inventors: Tomotaka Uekusa, Yokohama (JP); Yohei Horikawa, Tokyo (JP); Takeshi Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/670,180

(22) Filed: Mar. 26, 2015

(65) Prior Publication Data

US 2015/0281578 A1    Oct. 1, 2015

(30) Foreign Application Priority Data

Mar. 31, 2014    (JP) ................. 2014-072323

(51) Int. Cl.
*H04N 5/232* (2006.01)
*H04N 5/369* (2011.01)

(52) U.S. Cl.
CPC ..... *H04N 5/23212* (2013.01); *H04N 5/23229* (2013.01); *H04N 5/3696* (2013.01)

(58) Field of Classification Search
CPC ........... H04N 5/23212; H04N 5/23229; H04N 5/23232; H04N 5/3696
See application file for complete search history.

(56) References Cited

U.S. PATENT DOCUMENTS

2007/0252074 A1* 11/2007 Ng ................. G02B 3/0056
250/208.1

FOREIGN PATENT DOCUMENTS

| JP | 2006-345485 A | 12/2006 |
|----|---------------|---------|
| JP | 2007-004471 A | 1/2007 |
| JP | 2011-022796 A | 2/2011 |

* cited by examiner

*Primary Examiner* — Paul Berardesca
(74) *Attorney, Agent, or Firm* — Cowan, Liebowitz & Latman, P.C.

(57) ABSTRACT

An image processing apparatus, including a setting unit configured to set a focal plane of a still image, which is generated from moving image data including a plurality of frames, each of which is refocusable; a reconstruction unit configured to reconstruct a predetermined number of the frames of the moving image data in accordance with the focal plane of the still image, which is set by the setting unit, to thereby generate the predetermined number of refocused images; and a combining unit configured to combine the predetermined number of the refocused images, which are generated by the reconstruction unit, to thereby generate the still image.

23 Claims, 9 Drawing Sheets

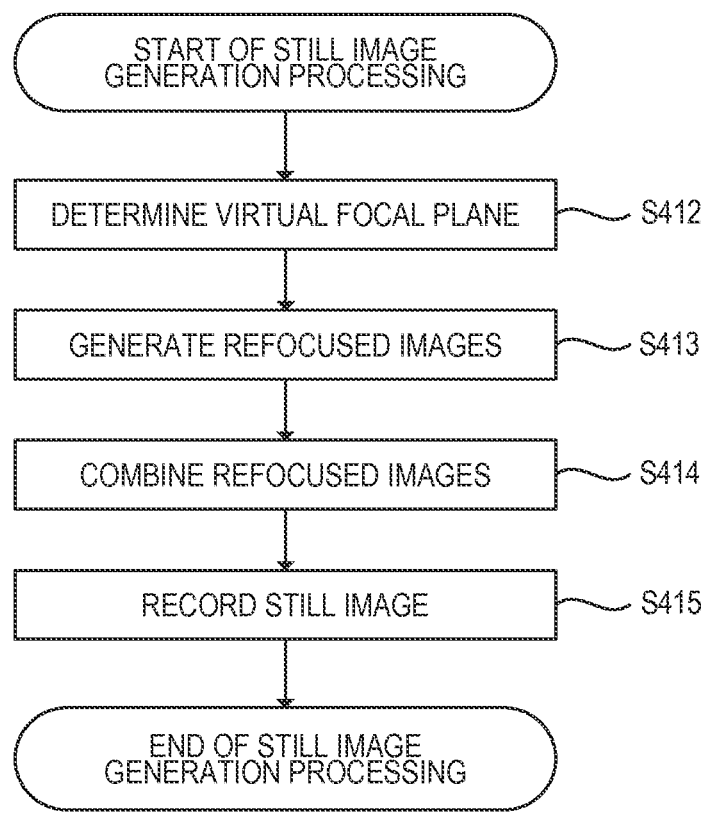

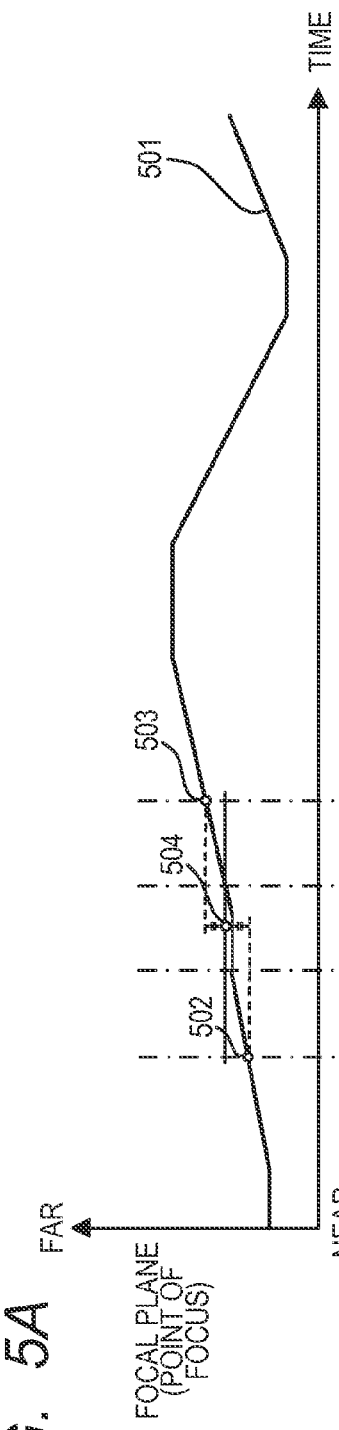
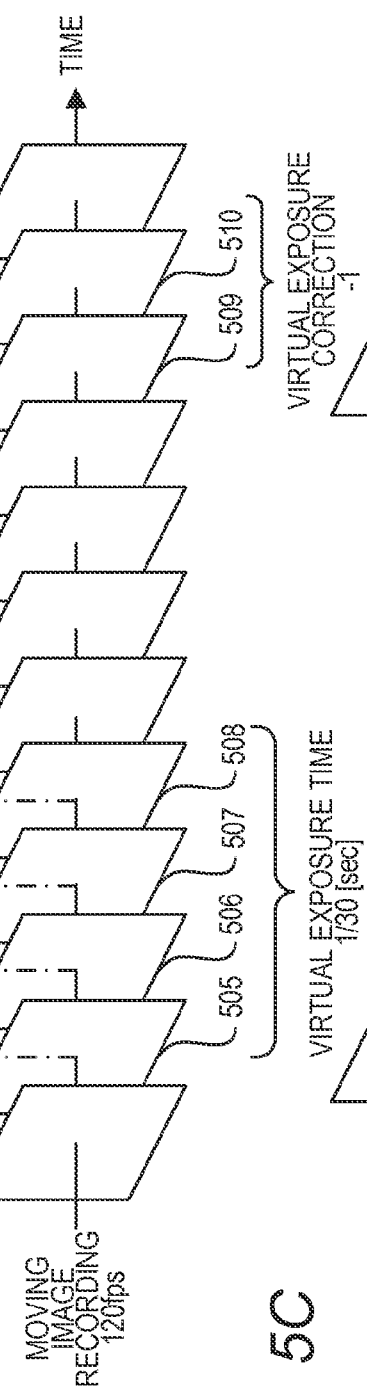
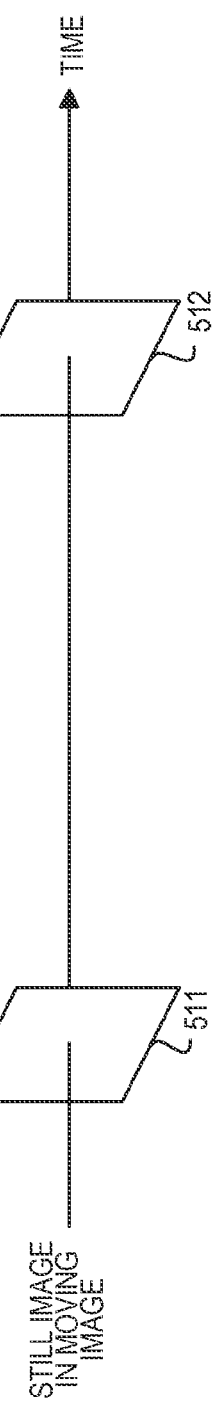
FIG. 5A
FIG. 5B
FIG. 5C

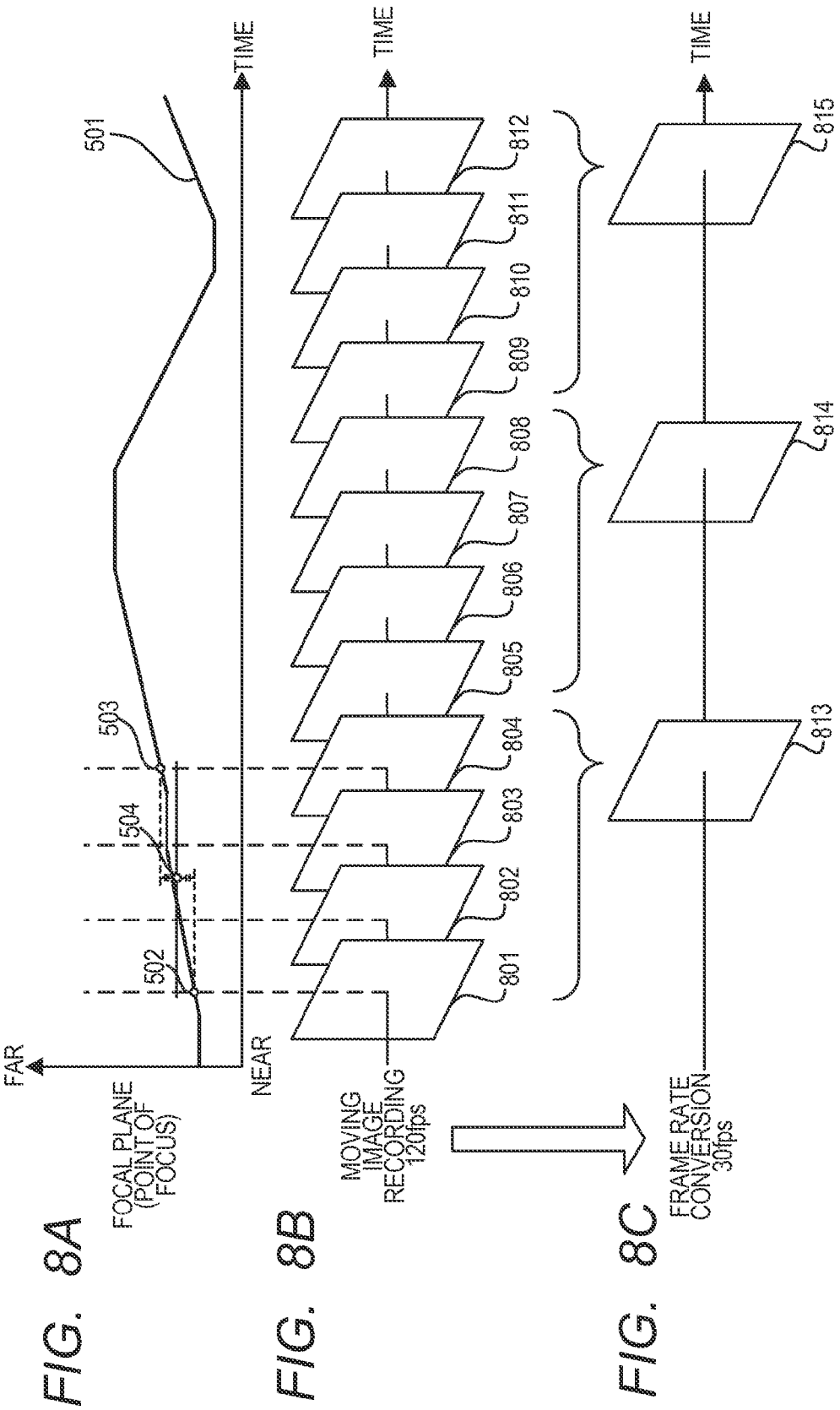

IMAGE PROCESSING APPARATUS, IMAGE PROCESSING METHOD, RECORDING MEDIUM, AND IMAGE PICKUP APPARATUS

BACKGROUND OF THE INVENTION

Field of the Invention

The present invention relates to an image processing apparatus, an image processing method, a recording medium, and an image pickup apparatus.

Description of the Related Art

There has been disclosed a technology of performing still image photography during moving image photography in a digital camera, which uses an image pickup element such as a complementary metal oxide semiconductor (CMOS) to obtain a still image or a moving image (Japanese Patent Application Laid-Open No. 2006-345485). According to the technology disclosed in Japanese Patent Application Laid-Open No. 2006-345485, a switch is temporarily made to a still image photography mode during the moving image photography to enable the still image photography during the moving image photography.

On the other hand, there has been disclosed a technology in which light beams that have passed through different regions of an exit pupil of an imaging optical system are acquired by an image pickup element, and signals obtained from the light beams that have passed through the different pupil regions are reconstructed to generate image data (refocused image) on an arbitrary focal plane in one photography (Japanese Patent Application Laid-Open No. 2007-004471).

SUMMARY OF THE INVENTION

According to one aspect of an embodiment, an image processing apparatus, including a setting unit configured to set a focal plane of a still image, which is generated from moving image data including a plurality of frames, each of which is refocusable; a reconstruction unit configured to reconstruct a predetermined number of the frames of the moving image data in accordance with the focal plane of the still image, which is set by the setting unit, to thereby generate the predetermined number of refocused images; and a combining unit configured to combine the predetermined number of the refocused images, which are generated by the reconstruction unit, to thereby generate the still image.

Further features of the present invention will become apparent from the following description of exemplary embodiments with reference to the attached drawings.

BRIEF DESCRIPTION OF THE DRAWINGS

FIGS. 4A and 4B are flow charts of an operation of processing a still image in a moving image in the image pickup apparatus according to the first embodiment of the present invention.

FIGS. 5A, 5B, and 5C are diagrams schematically illustrating determination of a focal plane and image combining processing in the operation of processing the still image in the moving image according to the first embodiment of the present invention.

FIGS. 8A, 8B, and 8C are diagrams schematically illustrating determination of a focal plane and image combining processing in the operation of processing the still image in the moving image according to the second embodiment of the present invention.

DESCRIPTION OF THE EMBODIMENTS

In Japanese Patent Application Laid-Open No. 2006-345485 described above, the switch is made to the still image photography mode during the moving image photography to record the still image, and hence there is a problem in that moving image recording is interrupted. Moreover, in a case where a moving image frame is extracted to generate the still image without interrupting the moving image recording, there is a problem in that a still image having exposure time that depends on a frame rate of the moving image recording is obtained.

In order to solve this problem, it may be contemplated to combine by addition a plurality of frames in a moving image to generate a still image having exposure time that is artificially changed. However, in a case where a focal plane has changed during the moving image photography, there is a problem in that, when the still image is generated by the combining by simple addition, the still image does not have a uniquely determined focal plane.

Moreover, in the technology disclosed in Japanese Patent Application Laid-Open No. 2007-004471 described above, it is difficult to obtain an image having a uniquely determined focal plane from a combined image.

Hereinafter, exemplary embodiments of the present invention are described in detail with reference to the accompanying drawings. Note that, in the following description, as the embodiments of the present invention, an example in which an image processing apparatus according to the present invention is applied to an image pickup apparatus is described. The image pickup apparatus, to which the image processing apparatus according to the present invention is applicable, includes a light field camera, a multiple-lens camera, and the like, which may be used to obtain imaging data from which a refocused image may be generated by reconstruction, and is an image pickup apparatus capable of moving image photography and still image photography during the moving image photography.

First Embodiment

Referring to FIGS. 1 to 6F, an image processing apparatus according to a first embodiment of the present invention is described.

Figure 1:
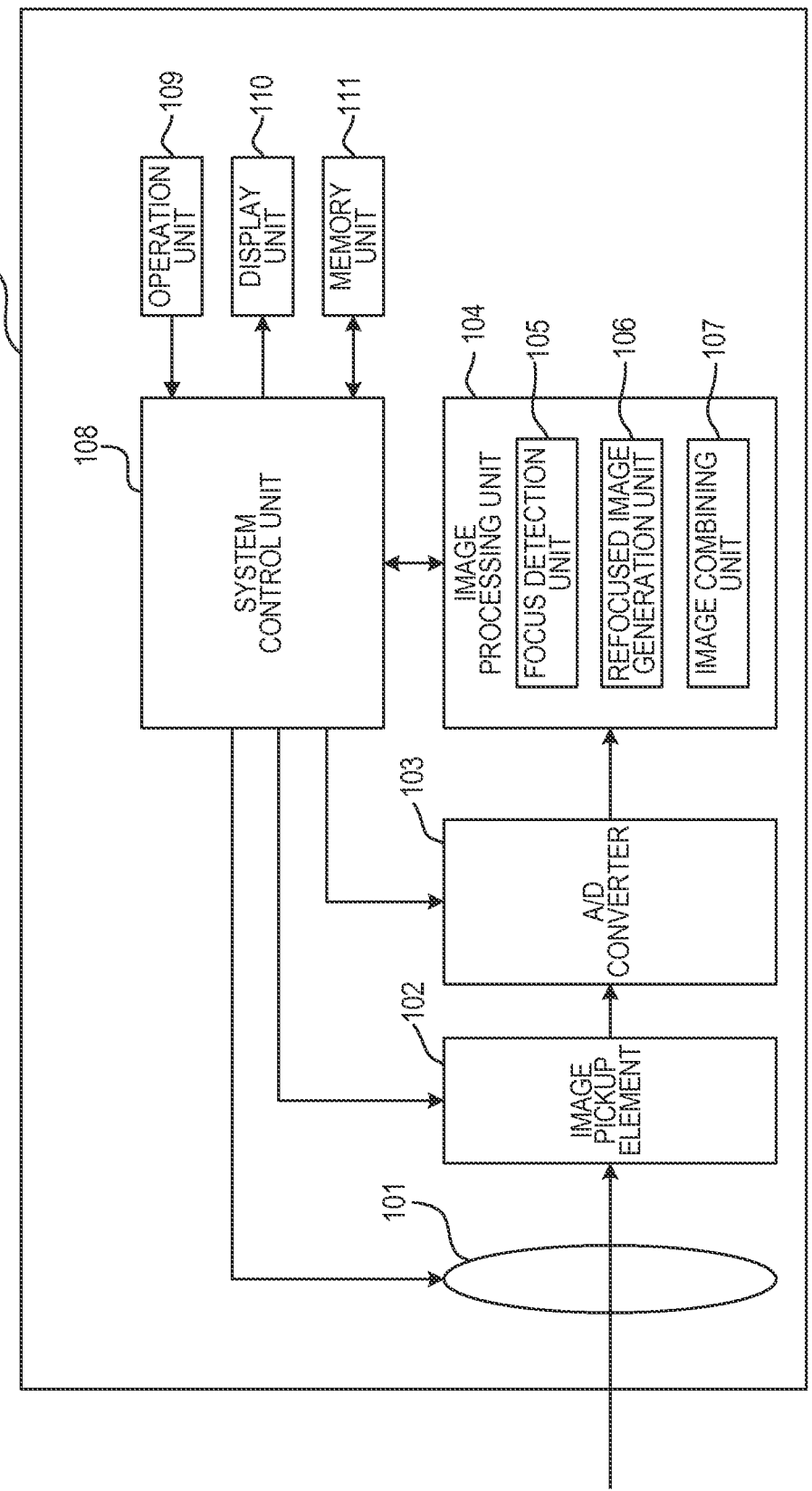
FIG. 1 is a block diagram illustrating a configuration of an image pickup apparatus to which an image processing apparatus according to a first embodiment of the present invention is applied.

FIG. 1 is a block diagram illustrating a configuration of an image pickup apparatus 100 to which the image processing apparatus according to this embodiment is applied. FIG. 1 illustrates a photographing optical system 101 including a focus lens. The photographing optical system 101 guides light from a subject to an image pickup element 102 through a plurality of lens groups and a diaphragm to form an optical image of the subject on an image pickup surface of the image pickup element 102. The focus lens included in the photographing optical system 101 is driven based on a driving instruction from a lens driving control unit (not shown) or a rotating operation of a focusing ring. By the driving of the focus lens, a point of focus can be adjusted.

On the image pickup surface of the image pickup element 102, a plurality of microlenses are arranged in a lattice pattern. Below each of the microlenses, a plurality of photoelectric conversion portions (pixel array) are arranged. Each of the microlenses pupil-divides a light flux passing through an exit pupil of the photographing optical system 101, and the plurality of photoelectric conversion portions are configured to respectively receive light beams that are pupil-divided by the microlenses. Therefore, the image pickup element 102 may be used to obtain pixel data that can be refocused from outputs of the plurality of photoelectric conversion portions (divided pixels). A detailed configuration of the image pickup element 102 is described later.

An A/D converter 103 is a converter for converting an analog signal from the image pickup element 102 into a digital signal. The A/D converter 103 outputs the digital signal obtained by the conversion to an image processing unit 104.

The image processing unit 104 includes circuits and a program group which have an image processing function and include a focus detection unit 105, a refocused image generation unit 106, and an image combining unit 107 to be described later. The image processing unit 104 performs predetermined image processing on imaging data output from the A/D conversion unit 103 based on a control instruction from a system control unit 108, to thereby generate image data for recording and image data for display.

The focus detection unit 105 includes circuits and programs for performing a predetermined calculation based on the imaging data obtained through the A/D conversion unit 103 so as to calculate an evaluation value to be used for lens position adjustment. The evaluation value calculated by the focus detection unit 105 is converted into a lens driving instruction through the system control unit 108. The obtained lens driving instruction is used to drive the photographing optical system 101. A detailed operation of the focus detection unit 105 is described later.

The refocused image generation unit 106 can generate images on the actually photographed physical focal plane and a focal plane (virtual focal plane) different from the physical focal plane (the images are hereinafter referred to as "refocused images") by performing combining processing on the imaging data obtained through the A/D conversion unit 103. A detailed operation of the refocused image generation unit 106 is described later.

The image combining unit 107 combines a plurality of refocused images, which are generated by the refocused image generation unit 106, to generate one still image. A detailed operation of the image combining unit 107 is also described later.

The system control unit 108 not only controls an operation of the entire system but also acquires data obtained by image processing and lens position information of the photographing optical system 101 to function to mediate data between blocks. A control program to be executed by the system control unit 108 is stored in advance in a memory (not shown).

An operation unit 109 is an operation member such as various switches or dials mounted to the image pickup apparatus 100. A photographer can set photographing parameters and control a photographing operation by using the operation unit 109. The operation input by the operation unit 109 is output to the system control unit 108.

A display unit 110 is a display such as a liquid crystal display (LCD). The display unit 110 displays an image obtained by photographing, the image data stored in a memory unit 111, and various setting screens that are transferred from the system control unit 108. The memory unit 111 records image data, which is transferred via the system control unit 108, and reads out the recorded data on and from a recording medium such as a Secure Digital (SD) card or a CompactFlash (CF) card.

Figure 2A:
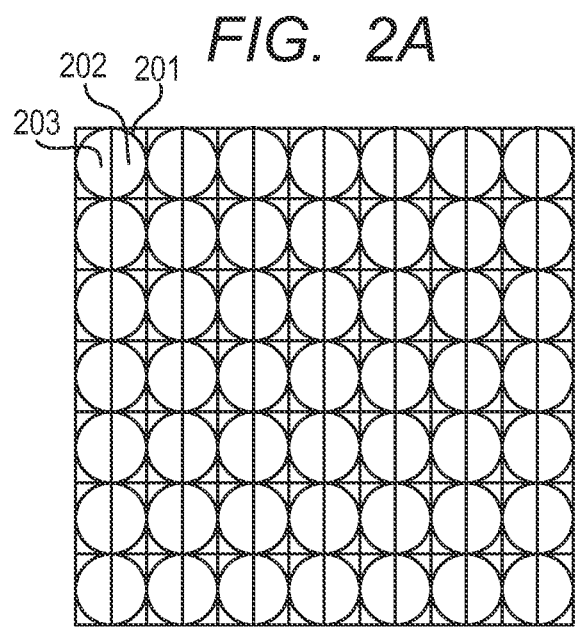
FIGS. 2A, 2B, and 2C are diagrams illustrating a configuration of an image pickup element included in the image pickup apparatus illustrated in FIG. 1.
Figure 2B:
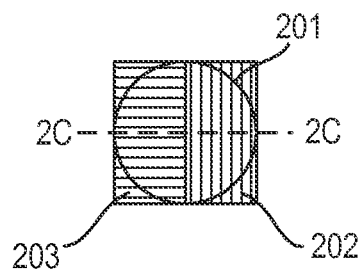
Figure 2C:
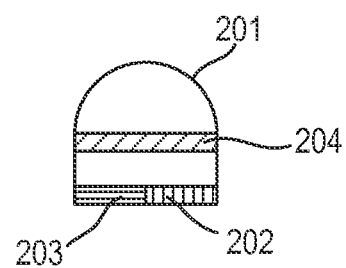
Figure 3:
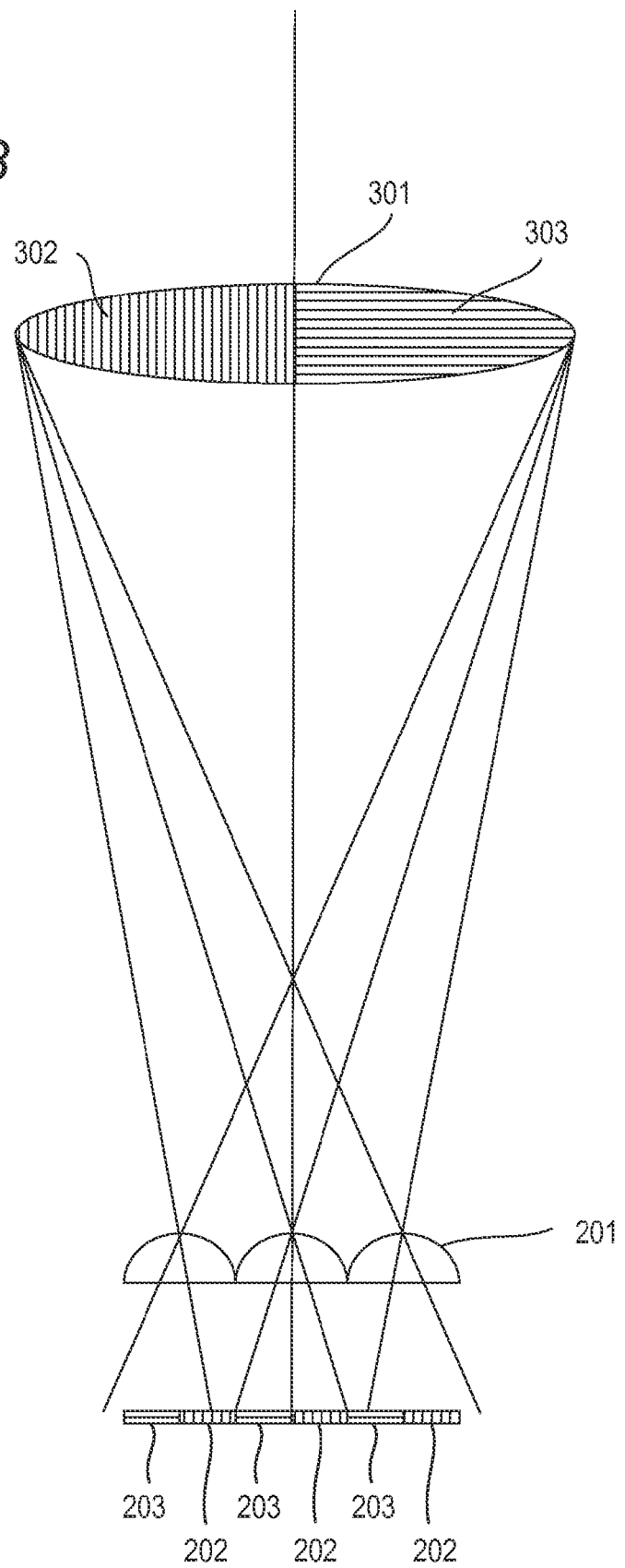
FIG. 3 is a diagram schematically illustrating a relationship between divided pixels included in the image pickup element illustrated in FIGS. 2A to 2C and incident light.

Next referring to FIGS. 2A to 3, a pixel configuration of the image pickup element 102 included in the image pickup apparatus 100, and light beams photoelectrically converted by the configuration are described.

FIG. 2A is a diagram obtained by enlarging a part of a pixel region of the image pickup element 102, and illustrates a correspondence between a microlens array and pixels. The circle 201 in FIG. 2A indicates a microlens. The rectangular region corresponding to the microlens 201 is a pixel (unit pixel) formed of two photoelectric conversion portions 202 and 203. In this manner, in the pixel region of the image pickup element 102, the microlenses 201 and the unit pixels are arranged two-dimensionally. Note that, the photoelectric conversion portions as denoted by the reference numerals 202 and 203 are hereinafter referred to as "divided pixels" of the unit pixel.

Next, a configuration of the unit pixel is described. FIG. 2B is a plan view of the unit pixel on the image pickup element 102. FIG. 2C is a cross-sectional view of the pixel taken along the line 2C-2C illustrated in FIG. 2B. Note that, in FIGS. 2A to 2C, the same parts are denoted by the same reference numerals.

The microlens 201 is arranged near an imaging plane of the photographing optical system 101, and collects light beams output from the photographing optical system 101. The light beams collected by the microlens 201 are transmitted through a color filter 204, and then converted into electric signals in the photoelectric conversion portions 202 and 203. Note that, the color filter 204 is a color filter of red (R), green (G), and blue (B) that are arranged in accordance with the Bayer array, for example.

FIG. 3 is a diagram illustrating correspondences of sub-regions of an exit pupil 301 of the photographing optical system and the divided pixels. As illustrated in FIG. 3, the divided pixel 202 and the divided pixel 203 receive the light beams that have passed through different regions (divided pupil regions) 302 and 303 on the exit pupil 301 of the photographing optical system 101, respectively. Note that, in this embodiment, a description is made of an example in which the unit pixel is divided by two to include two divided pixels. However, an applicable range of the present invention is not limited thereto, and another number of divisions may be adopted as long as the configuration may independently receive each of the light beams that have passed through the different regions on the exit pupil. In this manner, pixel signals output by the divided pixels 202 and 203 of each unit pixel of the image pickup element 102 have information on incident angles of the light beams incident thereon, and provide the pixel data (light field data) in which the focal plane may be changed after the photography and hence which can be refocused. Note that, imaged signals of the divided pixels 202 and 203 may be added to obtain a normal image signal having a resolution of the unit pixels.

Hereinabove, the configuration of the image pickup apparatus 100 to which the image processing apparatus according to this embodiment is applied has been described. Next, a still image photographing operation during the moving image photography in the image pickup apparatus according to this embodiment is described with reference to FIGS. 4A to 6F. This operation is achieved by the image processing apparatus according to this embodiment, which is applied to the image pickup apparatus 100.

Figure 4A:
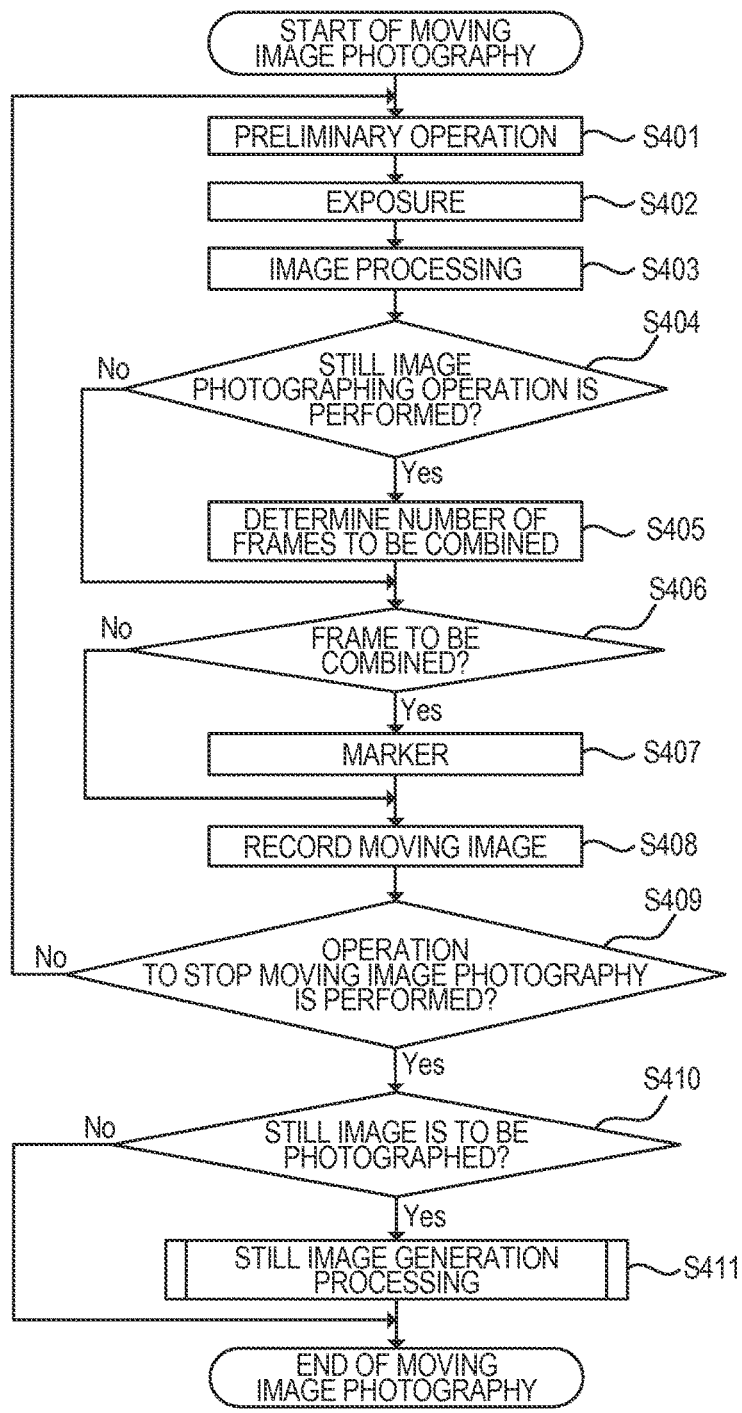

FIG. 4A is a flow chart of the still image photography processing operation during the moving image photography, and FIG. 4B is a detailed flow chart of still image generation processing (S411) of FIG. 4A. Note that, the processing operations of FIGS. 4A and 4B are controlled by a central processing unit (CPU) and a memory, which are included in the system control unit 108 of the image pickup apparatus, executing the control program. This control may be performed by separately installing the CPU and the memory to the image processing unit 104.

When an operation to start the moving image photography is executed by the operation unit 109, the image pickup apparatus 100 executes a moving image photography processing operation in accordance with the flow charts of FIGS. 4A and 4B.

In Step S401, the system control unit 108 performs preliminary operations such as autofocus and automatic exposure. When the operations preliminary to the photography are complete in Step S401, the system control unit 108 advances the processing operation to Step 3402.

In Step S402, under the control of the system control unit 108, exposure is performed at a shutter speed that depends on a moving image photography frame rate, and pixel signals of a region to be photographed (effective pixel region) are output from the image pickup element 102. When the exposure operation is complete in Step S402, the system control unit 108 advances the processing operation to Step S403.

In Step S403, the image processing unit 104 subjects imaging data of the region to be photographed, which is acquired by the image pickup element 102 and the A/D converter 103, to predetermined image processing to generate image data for recording and for display. When the image processing is complete in Step S403, the system control unit 108 advances the processing operation to Step S404.

In Step S404, the system control unit 108 determines whether or not a still image photographing operation is performed by the operation unit 109 during the moving image photography. In a case where it is determined in Step S404 that the still image photographing operation is performed, the system control unit 108 advances the processing operation to Step S405, and in a case where it is determined that the still image photographing operation is not performed, the system control unit 108 advances the processing operation to Step S406.

The processing operation in Step S405 is described with reference to FIGS. 5A to 5C. FIGS. 5A to 5C are diagrams schematically illustrating the still image photography processing operation during the moving image photography. FIG. 5A is an example of a change in focal plane (point of focus) with respect to photographing time, FIG. 5B is an example of recorded frames in a case where a moving image recording frame rate is 120 frames per second (fps), and FIG. 5C illustrates an example of recorded still image frames during the moving image photography. After the moving image photography (recording) is ended, the image processing apparatus according to this embodiment combines a predetermined number of frames of the recorded moving image data to generate still image data. At this time, in order to align focal planes of the predetermined number of moving image frames, frame images of the moving image data are reconstructed to generate the refocused images, and the generated refocused images are combined.

In Step S405, the image combining unit 107 calculates and determines the number of frames to be combined in generating a still image based on a shutter speed and an exposure correction value (still image photographing conditions), which are set in advance, and the moving image recording frame rate. As illustrated in FIGS. 5B and 5C, in a case where a still image 511 having a shutter speed of 1/30 seconds is set to be photographed when the frame rate of the moving image recording is 120 fps, the number of frames to be combined is four: recorded moving image frames 505 to 508. Moreover, in a case where a still image 512 which has the exposure correction value of −1, that is, which is corrected to be one-step darker is to be photographed, the number of frames to be combined is two: recorded moving image frames 509 and 510. As the recorded moving image frames, which are selected as the frames to be combined, with a frame at the time of the still image photographing operation being a reference frame, subsequent frames are selected by the number corresponding to the number of frames to be combined. When the number of frames to be combined by the image combining unit 107 to generate the still image is determined in Step S405, the system control unit 108 advances the processing operation to Step S406.

In Step S406, it is determined whether or not a moving image frame that is currently being processed by the image processing unit 104 is a frame to be combined that is selected by the image combining unit 107 in Step S405. In a case where it is determined in Step S406 that the currently processed frame is a frame to be combined, the system control unit 108 advances the processing operation to Step S407, and in a case where it is determined that the currently processed frame is not a frame to be combined, the system control unit 108 advances the processing operation to Step S408.

In Step S407, the image combining unit 107 marks the frame to be combined. In the case of FIGS. 5A to 5C, moving image frames 505 to 508, 509, and 510 are marked. In this manner, moving image frames to be combined for generating the still image after the moving image photography are extracted easily. When the marking processing is complete in Step S407, the system control unit 108 advances the processing operation to Step S408.

In Step S408, the data for recording, which is generated by the image processing unit 104, is recorded on a memory medium, which is inserted in a memory media slot (not shown) of the image pickup apparatus 100, via the system control unit 108 by the memory unit 111. Moreover, the data for display is displayed on the display unit 110 via the system control unit 108. When the moving image recording processing is complete in Step S408, the system control unit 108 advances the processing operation to Step S409.

In Step S409, the system control unit 108 determines whether or not an operation to stop the moving image photography is performed by the operation unit 109. In a case where it is determined in Step S409 that the operation to stop the moving image photography is performed, the system control unit 108 advances the processing operation to Step S410. On the other hand, in a case where the stopping operation is not performed in Step S409, the system control unit 108 returns the processing operation to Step S401 to start processing the next frame.

In Step S410, the system control unit 108 determines whether or not the still image photography is performed during the moving image photography. In a case where the still image photography is performed, the system control unit 108 advances the processing operation to Step S411, and in a case where the still image photography is not performed, the system control unit 108 ends the moving image photographing operation.

In Step S411, the image processing unit 104 generates the still image obtained by the still image photography that is performed during the moving image photography.

The still image generation processing in Step S411 is described with reference to the flow chart of FIG. 4B. FIG. 4B is the flow chart of the still image generation processing.

When the still image generation processing is started, first in Step S412, the refocused image generation unit 106 determines a virtual focal plane of a plurality of frames of a moving image, which are to be combined for generating the still image. As illustrated in FIGS. 5A and 5B, in a case where the focus lens is driven to change a focal plane 501 during the moving image photography, the focal plane is different for each of the frames 505 to 508 of the photographed moving image. Therefore, for example, when the plurality of moving image frames 505 to 508 are combined, an image that does not have a uniquely determined focal plane is disadvantageously generated. In order to address this problem, in this embodiment, the refocused images, which are obtained by refocusing the frames in directions in which the focal planes of the frame images are unified, are generated so that the focal plane of the still image after the combining is determined in an approximately unique manner. The virtual focal plane as a reference is determined as a median value of the focal planes of the moving image frames to be combined. For example, in a case where four recorded frames 505 to 508 of the moving image are to be combined, a focal plane 504, which corresponds to a median value of a focal plane 502 closest to a closest side and a focal plane 503 closest to an infinity side, is set as the reference virtual focal plane in generating the refocused images by the reconstruction processing. Alternatively, how to set the virtual focal plane as the reference is not particularly limited, and a focal plane of a frame that is closest to a shutter timing, or a focal plane of the first frame of the frames to be combined may be set as the reference virtual focal plane. Moreover, without strictly unifying the focal planes of the frames, a virtual focal plane of each frame may be set to be closer to the reference virtual focal plane than a physical focal plane of each frame. This also improves the appearance of the combined image.

Note that, focal plane information of each of the moving image frames is acquired by the focus detection unit 105. In the moving image photography, the focus detection unit 105 first generates divided pupil images from the imaged signals of the divided pixels of the unit pixels in an autofocus region. As already described in the description of the image pickup element 102, the divided pixels 202 and 203 receive the light beams that have passed through the different regions on the exit pupil, respectively. Therefore, outputs of the divided pixels, which are in a positional relationship that is symmetric with respect to a center of the microlens, may be collected to obtain a pair of divided pupil signals (divided pupil images). Next, the focus detection unit 105 performs a correlation calculation on the obtained pair of divided pupil images to calculate a difference between the signals, that is, an amount of image shift. In the correlation calculation, absolute values of difference values of overlapping pixels are integrated while the pairs of divided pupil images are shifted in a horizontal direction to acquire evaluation values. Next, an amount of shift of the images to a position at which the evaluation value becomes the lowest, that is, a position at which a degree of matching of the divided pupil images becomes the highest is calculated. The focus detection unit 105 determines a drive amount of the photographing optical system 101 based on the amount of shift, and the system control unit 108 drives the photographing optical system in accordance with the determined drive amount to perform a focal plane adjustment. At this time, the focus detection unit 105 outputs the focal plane information on each frame from a focus lens position after the focus adjustment. Note that, those technologies are publicly known, and hence details thereof are omitted. Moreover, the example in which the absolute values of the differences of the pixels between the divided pupil images are used as the evaluation values has been described herein, but the evaluation values may be acquired by a sum of squares of the difference values or other such methods.

In Step S413, the refocused image generation unit 106 performs refocused image generation processing on the plurality of frames to be combined, which are identified by the markers, based on the virtual focal plane determined in Step S412 to unify the focal planes of the plurality of frames to be combined. Alternatively, the virtual focal plane of each frame is set to be closer to the reference focal plane than the physical focal plane of each frame to perform the refocused image generation processing.

Next referring to FIGS. 6A to 6F, a principle of refocusing is described. FIGS. 6A to 6F are diagrams illustrating an operation of refocus processing.

Figure 6A:
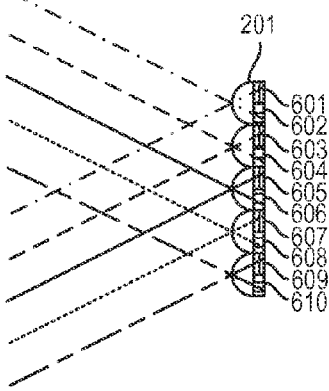
FIGS. 6A, 6B, 6C, 6D, 6E, and 6F are diagrams schematically illustrating refocus processing.

FIG. 6A illustrates a relationship of incident light and the focal plane in a region of the image pickup element 102 at the time of photography. The focal plane is at an array surface of the microlenses 201, and an in-focus subject image is formed on an image pickup surface of the image pickup element. Therefore, the light beams indicated by the lines of the same type (solid lines, broken lines, dotted lines, and the like) are incident on the divided pixels of each microlens 201.

Figure 6B:
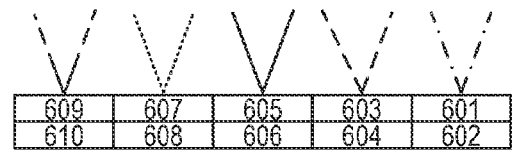

The light beams that have passed through the exit pupil regions 302 and 303, which have been described with reference to FIG. 3, are pupil-divided by the microlens to be received by the divided pixels. Divided pixels 602, 604, 606, 608, and 610 receive the light beams that have passed through the exit pupil region 302, and the divided pixels 601, 603, 605, 607, and 609 receive the light beams that have passed through the exit pupil region 303. The imaged signals may be added for each pair of the divided pixels 601 and 602, 603 and 604, 605 and 606, 607 and 608, and 609 and 610 to obtain image data of the in-focus subject image having the resolution of the unit pixels. FIG. 6B is a diagram schematically illustrating this. Each pair of the divided pixels 601 and 602, 603 and 604, 605 and 606, 607 and 608, and 609 and 610 under the same microlens may be added to obtain an image formed by the lines of the same type.

Figure 6C:
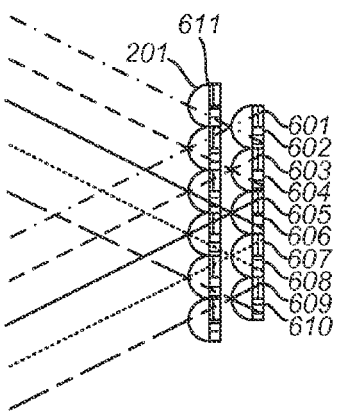
Figure 6D:
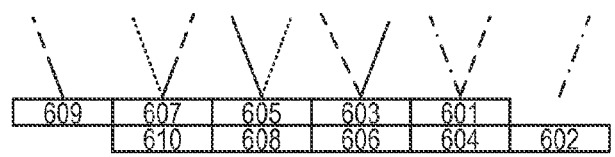

FIG. 6C is a diagram schematically illustrating correspondences of the incident light and the divided pixels on a virtual focal plane 611 on which the refocused images is generated. As illustrated in the figure, the pixel data of each of the divided pixels has beam information illustrated in FIG. 6A. Therefore, the imaging data of the unit pixels on the virtual focal plane 611 is obtained by shifting and adding the pixel data obtained in FIG. 6A. FIG. 6D schematically illustrates the shifted addition, which is the addition of the pixel data obtained by the lines of the different types forming the image. The image data obtained by performing the shifted addition as illustrated in FIG. 6D may be treated as being equivalent to the image data obtained on the virtual focal plane 611.

Figure 6E:
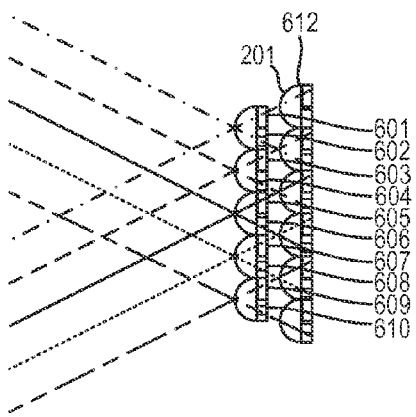
Figure 6F:

FIGS. 6E and 6F illustrate shifted addition in a case where a virtual focal plane 612 is set in a direction opposite to FIG. 6C. Signals equivalent to signals obtained on the virtual focal plane 612 as illustrated in FIG. 6E may be obtained by the shifted addition in FIG. 6F.

With the use of the shifted addition (reconstruction processing) as described above, the refocused images that are in focus on an arbitrary subject region may be generated. By the reconstruction processing described above, the refocused images corresponding to the reference virtual focal plane, which is determined in Step S412, are generated.

Note that, the method of the refocus processing has heretofore been described taking as an example the case where there are two divided pixels for one microlens 201, but the range of the present invention is not limited thereto. Any method may be employed as long as the reconstruction processing corresponding to the pixel structure such as the number of divided pixels and a configuration of the optical system is performed to obtain the refocused images corresponding to the virtual focal plane. Those technologies are publicly known, and hence details thereof are omitted.

Further, for the sake of simplicity of description, the example of the processing of generating the refocused images using the simple shift-and-add operation has been described. However, a method of obtaining the refocused image is not limited thereto. The refocused image on the virtual focal plane may be obtained by using another method. For example, processing using weighting addition as described in Japanese Patent Application Laid-Open No. 2007-004471 may be used.

Next in Step S414, the image combining unit 107 combines the plurality of refocused images, which are generated based on the virtual focal plane, to generate the still image corresponding to the shutter speed and the exposure correction value, which are set in advance.

As described above, in this embodiment, processing of generating the refocused images by the reconstruction is performed on the plurality of moving image frames to be combined to unify the virtual focal planes of the plurality of frames, and hence the still image having the uniquely determined focal plane may be generated even when the plurality of frames are combined.

In a case where an effect of a change in shutter speed accompanying the exposure correction is to be obtained, the frames are combined by addition to generate a lightened image. Moreover, in a case where the shutter speed is set, the photographer does not intend to change the exposure, and hence the frames are combined by an arithmetic mean to generate a still image having an apparently lower sensitivity. Repetition of the combining by addition may cause overexposure, and hence even when the number of frames to be combined is increased by the combining by the arithmetic mean, an adjustment is always made to ensure normal exposure. How much the shutter speed is changed (setting of the shutter speed of the still image) may be set by an operation input by the user, or may be set automatically by exposure control. The setting is reflected on setting of the number of images to be combined.

Note that, the examples of the combining processing by means of the combining by addition and the combining by the arithmetic mean have been described herein. However, the present invention is not limited thereto, and another method may be used to perform the combining processing depending on the purpose. For example, combining processing using normalization of exposure may be performed.

Finally, in Step S415, the still image data, which is generated in Step S414, is recorded on the memory medium inserted in the memory media slot (not shown) of the image pickup apparatus 100 via the system control unit 108 by the memory unit 111. Moreover, depending on the setting, data for confirmation of the still image may also be temporally displayed on the display unit 110 via the system control unit 108. When the still image recording processing is complete, the still image generation processing is ended, and the moving image photography processing operation is ended.

As described above, according to this embodiment, in the case where the still image recording during the moving image photography is performed, the plurality of moving image frames based on the still image photographing condition are combined after the focal planes are brought closer to the virtual focal plane as the reference by the refocusing. This allows a good still image having exposure time that does not depend on the moving image recording frame rate and having a small shift of the focal plane to be generated.

The combining of the frames after the refocusing is performed by the combining by simple addition, with the result that the still image having the lower shutter speed and increased exposure may be obtained. On the other hand, the combining by the arithmetic mean may be performed to obtain the still image having the lower shutter speed and constant exposure, and hence the apparent sensitivity may be reduced.

In this embodiment, the processing operation in which the still image is generated in accordance with the still image photographing operation during the moving image photography has been described. However, the present invention is not limited thereto, and the still image may also be generated at an arbitrary timing and with arbitrary settings while reproducing moving image recording data. In this case, the image processing apparatus according to this embodiment may also be realized with an information processing apparatus such as a personal computer (PC) having a function of reproducing the moving image data by giving the function of setting processing of the still image photography to the image processing apparatus.

Moreover, in selecting the plurality of frames to be combined, the example in which the frame at the time when the still image photographing operation is performed is set as the reference and a necessary number of subsequent frames are selected has been described. The present invention is not limited thereto, and a frame at the time of the still image photographing operation or at a specified arbitrary timing may be set as an intermediate frame or a final frame. In this manner, it is possible to obtain similar effects as those obtained when timings of a front curtain and a rear curtain of the shutter are changed.

Moreover, as the method of determining the virtual focal plane in the refocusing, an example of the focal plane corresponding to the median value of all the frames to be combined has been described. However, the present invention is not limited thereto, and the focal plane at the time of the still image photographing operation or at the specified arbitrary timing may be used. Alternatively, the focal plane of the first frame or the last frame of the plurality of frames to be combined may be used. The focal plane may be changed to obtain an image intended by the photographer or an unexpected image.

Moreover, in a case where the focal plane has not changed or has changed only in a predetermined range in the plurality of frames to be combined, processing of determining the virtual focal plane as the reference (S412) and generating the refocused images (S413) may not be performed to reduce a processing load and power consumption.

Second Embodiment

Figure 7:
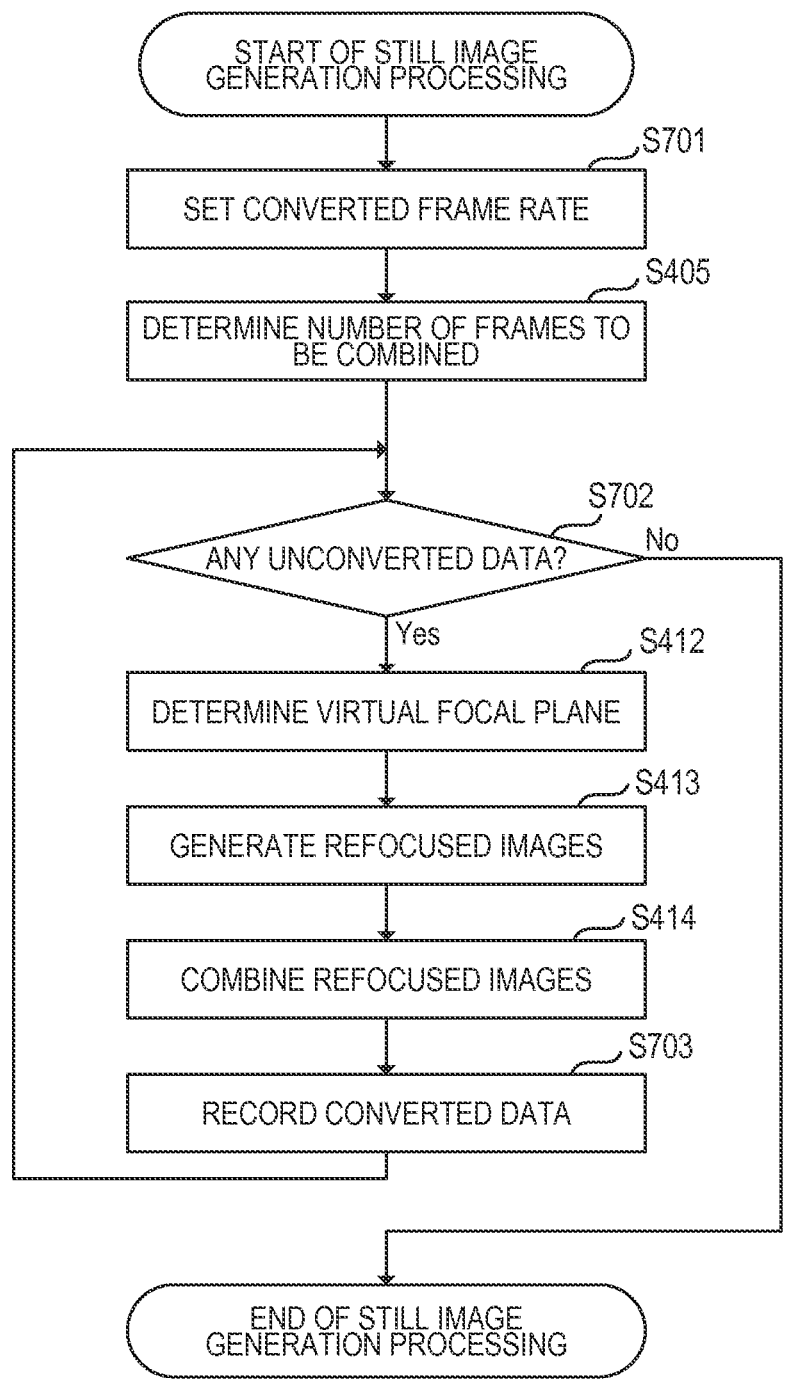
FIG. 7 is a flow chart of an operation of processing a still image in a moving image according to a second embodiment of the present invention.

Next referring to FIGS. 7 to 8C, a second embodiment of the present invention is described. This embodiment describes an image pickup apparatus to which an image processing apparatus, which accomplishes the still image generation processing (S411) described in the first embodiment as processing operation in which a still image is generated by converting a frame rate of a recorded moving image including a plurality of frames to a lower value, is applied. A configuration of the image pickup apparatus is similar to that of the first embodiment, and hence a description thereof is omitted. A processing operation in moving image photography is also similar to that of the first embodiment (FIG. 4A). Note, however, that this embodiment employs a configuration in which a still image generation processing operation is started by an operation of the operation unit 109 of the image pickup apparatus 100 after finishing the moving image photography, and hence there is no need to execute Steps S404 to S407. However, for example, in a case where a configuration in which a frame rate after the conversion or a range of the moving image data to be subjected to the frame rate conversion is specified by the operation unit 109 during the moving image photography is adopted, Steps S404 to S407 may be executed. Hereinafter, referring to FIGS. 7 to 8C, the still image generation processing operation in this embodiment is described.

FIG. 7 is a flow chart of the still image generation processing operation according to this embodiment. Moreover, FIGS. 8A to 8C are diagrams schematically illustrating the still image generation processing operation in a case where the frame rate of the recorded moving image is converted from 120 fps to 30 fps. Note that, in FIG. 7, parts similar to those of the first embodiment are denoted by the same reference symbols. Also in FIGS. 8A to 8C, parts similar to those of the first embodiment are denoted by the same reference symbols.

When an operation to start the still image generation processing operation is executed by the operation unit 109 of the image pickup apparatus 100, the system control unit 108 executes the processing operation in the flow chart of FIG. 7. Note that, a determination on whether or not the operation by the operation unit 109 is executed corresponds to Step S410 in the first embodiment.

In Step S701, the system control unit 108 displays a list of convertible frame rates on the display unit 110, and sets the converted frame rate in accordance with the input by the operation unit 109. When the converted frame rate is set, the system control unit 108 advances the processing operation to Step S405.

In Step S405, as in the first embodiment, the image combining unit 107 calculates and determines the number of frames used for the combining based on the set frame rate. As illustrated in FIGS. 8A to 8C, in the case where the frame rate is converted from 120 fps to 30 fps, the number of frames to be converted is four: recorded moving image frames 801 to 804, 805 to 808, and 809 to 812. When the number of frames to be combined is determined in Step S405, the system control unit 108 advances the processing operation to Step S702.

In Step S702, the system control unit 108 determines whether or not there is any unconverted data in the recorded moving image data. In a case where there is unconverted data, the processing operation proceeds to Step S412, and in a case where there is no unconverted data, the still image generation processing operation is ended.

In Steps S412 to S414, as in the first embodiment, the virtual focal plane is determined, the refocused images having the unified focal plane are generated and combined for the plurality of frames to be combined, and converted frames 813 to 815 are generated. Note that, in the image combining in Step S414, the combining by the arithmetic mean or the normalization is performed so as not to cause overexposure due to the combining. When a new frame is generated by the image combining in Step S414, the system control unit 108 advances the processing operation to S703.

In Step S703, the still image data generated by converting the frame rate in Step S414 is recorded on the memory medium, which is inserted in the memory media slot (not shown) of the image pickup apparatus 100 via the system control unit 108 by the memory unit 111. When the processing of recording the still image data ends, the system control unit 108 returns the processing operation to Step S702, and repeats the processing operation of Steps S702, S412 to S414, and S703 until the conversion of the frame rate is complete for all the moving image data.

As described above, according to the second embodiment also, the images are combined after the focal planes are unified to generate the still image, and hence a good still image having the uniquely determined focal plane may be generated.

Note that, in Step S701, the range of the moving image data to be subjected to the frame rate conversion may also be specified. In that case, the determination in Step S702 is performed for the specified range of the moving image data.

Note that, in this embodiment, the light field data is acquired by an optical system as illustrated in FIGS. 2A to 3 as described below, but the image pickup unit is not limited thereto. For example, as in Japanese Patent Application Laid-Open No. 2011-22796, a configuration in which a plurality of cameras having different points of view are collectively regarded as an image pickup unit may be adopted. Moreover, as opposed to the optical system in FIGS. 2A to 3, in order for an object plane and the image pickup element to have a conjugate relationship, a configuration in which a light beam from the photographing optical system is imaged on the microlens array and the image pickup element is provided on the imaging plane may be adopted. Further, a configuration in which the light beam from the photographing optical system is reimaged on the microlens array (the term "reimaging" is used because the light beam that has once been imaged and is in a state of being diffused is imaged) and the image pickup element is provided on the imaging plane may be adopted. It is also possible to use a method in which a mask (gain modulation element) having an appropriate pattern is inserted in the optical path of the photographing optical system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-072323, filed Mar. 31, 2014 which is hereby incorporated by reference wherein in its entirety.

What is claimed is:

1. An image processing apparatus, comprising:
   one or more processors; and
   a memory storing instructions which, when the instructions are executed by the processors, cause the image processing apparatus to function as:
   a setting unit configured to set a focal plane of a still image, which is generated from moving image data including a plurality of frames, each of which is refocusable;
   a reconstruction unit configured to reconstruct a predetermined number of the frames of the moving image data in accordance with the focal plane of the still image, which is set by the setting unit, to thereby generate the predetermined number of refocused images; and
   a combining unit configured to combine the predetermined number of the refocused images, which are generated by the reconstruction unit, to thereby generate the still image.

2. The image processing apparatus according to claim 1, wherein the setting unit sets, based on information on the focal planes of the predetermined number of the frames of the moving image data, the focal plane of the still image generated by the combining unit.

3. The image processing apparatus according to claim 2, wherein the focal plane of the still image, which is set by the setting unit, comprises one of a median value of the focal plane closest to a closest side and the focal plane closest to an infinity side of the focal planes of the predetermined number of the frames of the moving image data, the focal plane of a predetermined frame of the predetermined number of the frames of the moving image data, and the focal plane of a specified frame of the predetermined number of the frames of the moving image data.

4. The image processing apparatus according to claim 3, wherein the predetermined frame comprises one of a first frame and a last frame of the predetermined number of the frames of the moving image data.

5. The image processing apparatus according to claim 1, wherein in a case where the focal planes of the predetermined number of the frames do not change, the combining unit combines the predetermined number of the frames of the moving image data.

6. The image processing apparatus according to claim 1, wherein the combining of the predetermined number of the refocused images by the combining unit comprises any one of simple addition, arithmetic mean, and normalization of image data of each of the refocused images.

7. The image processing apparatus according to claim 1,
   wherein the setting unit sets a shutter speed of the still image, which is generated from the moving image data, and
   wherein the combining unit determines the predetermined number based on the shutter speed and a frame rate of the moving image data.

8. The image processing apparatus according to claim 1,
   wherein the setting unit sets a frame rate of the still image, which is generated from the moving image data, and
   wherein the combining unit determines the predetermined number based on the frame rate of the still image and a frame rate of the moving image data.

9. The image processing apparatus according to claim 1, wherein the moving image data comprises moving image data reproduced from a recording medium.

10. The image processing apparatus according to claim 9, wherein the moving image data reproduced from the recording medium contains markers for identifying the predetermined number of frames of the moving image data.

11. An image processing method, comprising:
    setting a focal plane of a still image, which is generated from moving image data including a plurality of frames, each of which is refocusable;
    reconstructing a predetermined number of the frames of the moving image data in accordance with the focal plane of the still image, to thereby generate the predetermined number of refocused images; and
    combining the predetermined number of the refocused images, to thereby generate the still image.

12. A non-transitory computer-readable recording medium having recorded thereon a computer program for causing a computer to function as:
    a setting unit configured to set a focal plane of a still image, which is generated from moving image data including a plurality of frames, each of which is refocusable;
    a reconstruction unit configured to reconstruct a predetermined number of the frames of the moving image data in accordance with the focal plane, which is set by the setting unit, to thereby generate the predetermined number of refocused images; and
    a combining unit configured to combine the predetermined number of the refocused images, which are generated by the reconstruction unit, to thereby generate the still image.

13. An image pickup apparatus, comprising:
    one or more processors; and a memory storing instructions which, when the instructions are executed by the processors, cause the image pickup apparatus to function as:

an image pickup unit configured to image an optical image of a subject, which is formed by a photographing optical system, to thereby generate moving image data including a plurality of frames, each of which is refocusable;

a recording unit configured to record the moving image data on a recording medium;

a setting unit configured to set a focal plane of a still image, which is generated from the moving image data recorded on the recording medium;

a reconstruction unit configured to reconstruct a predetermined number of the frames of the moving image data, which is recorded by the recording unit, in accordance with the focal plane, which is set by the setting unit, to thereby generate the predetermined number of refocused images; and a combining unit configured to combine the predetermined number of the refocused images, which are generated by the reconstruction unit, to thereby generate the still image.

14. The image pickup apparatus according to claim 13, further comprising:

an operation unit configured to issue an instruction to photograph the still image; and a control unit configured to control the setting unit, the reconstruction unit, and the combining unit in accordance with the instruction by the operation unit to generate the still image from the moving image data, which is recorded by the recording unit.

15. The image pickup apparatus according to claim 13, further comprising a unit configured to generate information on the focal plane of each of the frames of the moving image data, which is generated by the reconstruction unit, wherein the setting unit sets the focal plane of the still image, which is generated from the moving image data, based on the information on the focal plane of each of the frames of the moving image data.

16. The image pickup apparatus according to claim 13, wherein the image pickup unit further comprises a pupil division unit of an exit pupil of the photographing optical system, and wherein the image pickup unit includes a pixel matrix formed by unit pixels, each of which includes a plurality of divided pixels corresponding to divided pupil regions of the exit pupil obtained by the pupil division unit.

17. The image pickup apparatus according to claim 16, wherein the pupil division unit comprises an array of microlenses, and the unit pixels are arranged to correspond to the microlenses.

18. An image processing apparatus, comprising:
one or more processors; and a memory storing instructions which, when the instructions are executed by the processors, cause the image processing apparatus to function as:

an obtaining unit configured to obtain a plurality of image data, each of which is refocusable;

a setting unit configured to set a focal plane;

a generating unit configured to generate a predetermined number of refocused images corresponding to the focal plane set by the setting unit by using the predetermined number of image data among the plurality of image data; and a combining unit configured to combine the predetermined number of the refocused images to thereby generate an image.

19. The image processing apparatus according to claim 18, wherein the plurality of image data is captured sequentially by an image pickup unit.

20. The image processing apparatus according to claim 18, wherein the generating unit generate a refocused image at a virtual focal plane set by the setting unit.

21. The image processing apparatus according to claim 18, wherein the generating unit generates a refocused image by adding pixel signals corresponding to a same pixel at a focal plane set by the setting unit.

22. An image processing method comprising:

obtaining a plurality of image data, each of which is refocusable;

setting a focal plane;

generating a predetermined number of refocused images corresponding to the focal plane by using the predetermined number of image data among the plurality of image data; and combining the predetermined number of the refocused images to thereby generate an image.

23. A non-transitory computer-readable recording medium having recorded thereon a computer program for causing a computer to function as:

an obtaining unit configured to obtain a plurality of image data, each of which is refocusable;

a setting unit configured to set a focal plane;

a generating unit configured to generate a predetermined number of refocused images corresponding to the focal plane set by the setting unit by using the predetermined number of image data among the plurality of image data; and a combining unit configured to combine the predetermined number of the refocused images to thereby generate an image.

* * * * *